United States Patent [19]
Nilsson

[11] Patent Number: 5,867,765
[45] Date of Patent: *Feb. 2, 1999

[54] NON-GEOSTATIONARY SATELLITE MOBILE COMMUNICATION SYSTEM INTEGRATION WITH NETWORK PRINCIPLES FOR TERRESTRIAL CELLULAR

[75] Inventor: Mats Nilsson, Stockholm, Sweden

[73] Assignee: Telefonaktiebolaget LM Ericsson, Stockholm, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 414,099

[22] Filed: Mar. 31, 1995

[51] Int. Cl.$^6$ ................................................ H04B 7/185
[52] U.S. Cl. .......................................... 455/13.1; 455/427
[58] Field of Search ................................ 455/12.1, 13.1, 455/13.2, 33.1, 33.2, 34.1, 54.1, 53.1, 56.1, 62, 63, 422, 427, 428, 436, 524; 379/60

[56] References Cited

U.S. PATENT DOCUMENTS

| | | | |
|---|---|---|---|
| 5,081,703 | 1/1992 | Lee | 455/13.1 |
| 5,119,504 | 6/1992 | Durboraw, III | 455/13.2 |
| 5,161,248 | 11/1992 | Bertiger et al. | 455/12.1 |
| 5,235,633 | 8/1993 | Dennison et al. | 455/12.1 |
| 5,249,181 | 9/1993 | Wang et al. | 370/95.3 |
| 5,303,286 | 4/1994 | Wiedeman | 455/12.1 |
| 5,343,512 | 8/1994 | Wang et al. | 455/12.1 |
| 5,408,237 | 4/1995 | Patterson et al. | 455/12.1 |
| 5,448,623 | 9/1995 | Wiedeman et al. | 455/12.1 |

FOREIGN PATENT DOCUMENTS

| | | |
|---|---|---|
| 536 921 A1 | 4/1993 | European Pat. Off. . |
| 562 374 A1 | 9/1993 | European Pat. Off. . |
| 569 693 A1 | 11/1993 | European Pat. Off. . |
| 637 142 A1 | 2/1995 | European Pat. Off. . |
| WO91/15071 | 10/1991 | WIPO . |

*Primary Examiner*—Reinhard J. Eisenzopf
*Assistant Examiner*—Marsha D. Banks-Harold
*Attorney, Agent, or Firm*—Burns, Doane, Swecker & Mathis, L.L.P.

[57] ABSTRACT

A non-geostationary satellite communication system comprises a cellular system controller, a satellite system controller, and a management controller. The cellular system controller assigns each mobile station in the cellular system to a specific region and creates a record of such assignment, wherein each mobile station periodically updates its location within the system. The satellite system controller tracks the position and motion of the satellite and assigns and records the assignment of terrestrial regions, i.e., radio resources, to each satellite, and periodically hands off coverage of one region from one satellite to another. The management controller maps the region assignment records of the mobile stations with the satellite assignment records of the regions so as to perform mobility functions, handover, and location management due to the motion of the satellites and the mobile stations.

18 Claims, 4 Drawing Sheets

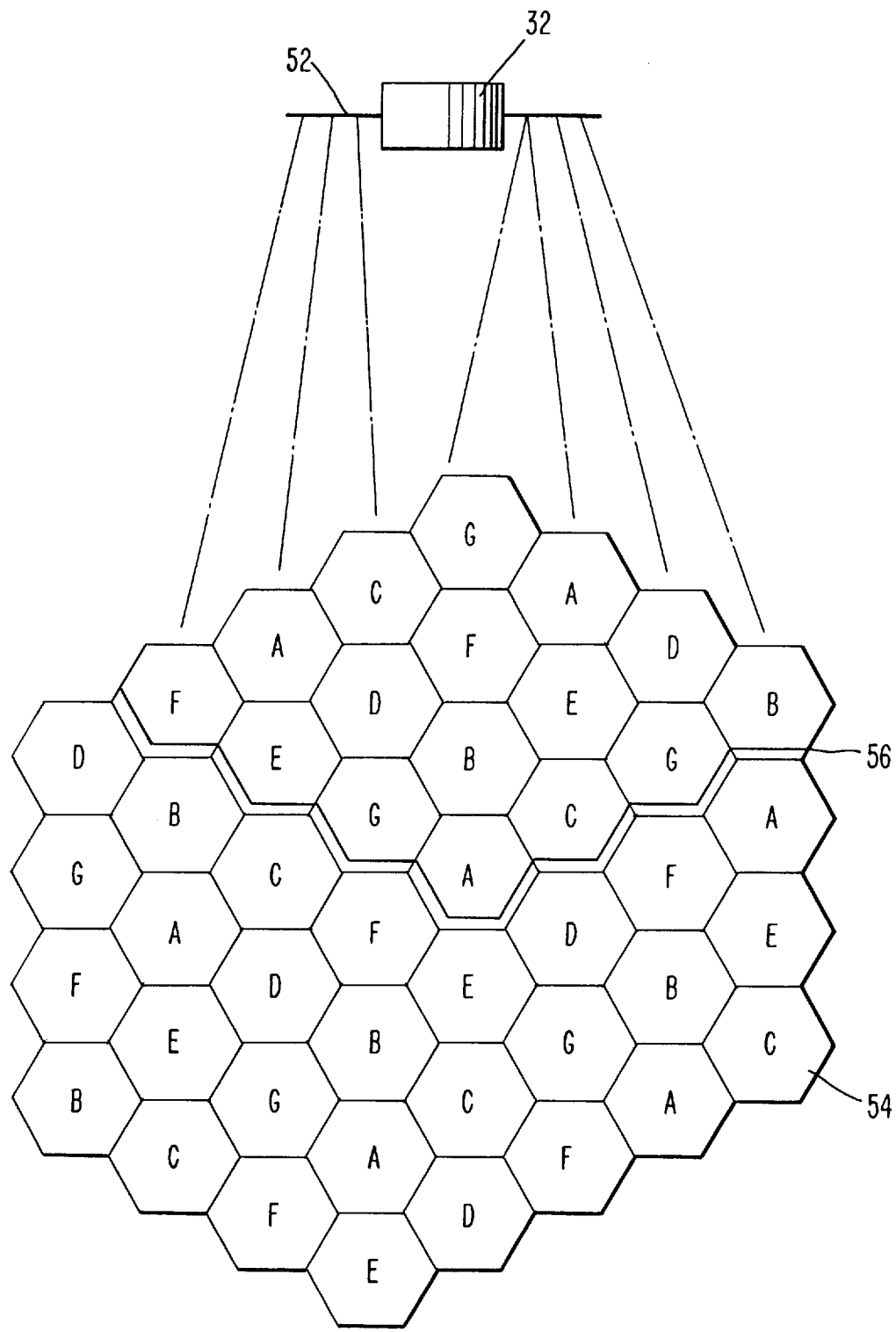

NON-GEOSTATIONARY SATELLITE MOBILE COMMUNICATION SYSTEM INTEGRATION WITH NETWORK PRINCIPLES FOR TERRESTRIAL CELLULAR

FIELD OF THE INVENTION

The present invention relates to a non-geostationary satellite mobile communication system, and more particularly to handover and location management in non-geostationary satellite mobile communication systems.

BACKGROUND OF THE INVENTION

Cellular communications is quickly becoming an accepted and valuable facet of everyday life. At first, land-based cellular communication systems were used to provide coverage for the cellular systems. A typical terrestrial or land-based cellular communication system is illustrated in FIG. 1. FIG. 1 illustrates ten cells or regions C1–C10 in a typical land-based cellular mobile radio communication system. Normally a cellular mobile radio system would be implemented with more than ten cells. However, for the purpose of simplicity, the present invention can be explained using the simplified representation illustrated in FIG. 1. For each cell C1–C10, there is a base station B1–B10 with the same reference number as the corresponding cell. FIG. 1 illustrates the base stations as situated in the vicinity of the cell center and having omni-directional antennas. FIG. 1 also illustrates nine mobile stations M1–M9 which are moveable within a cell and form one cell to another. In a typical cellular radio communication system, there would normally be more than nine cellular mobile stations. In fact, there are typically many times the number of mobile stations as there are base stations. However, for the purposes of explaining the present invention, the reduced number of mobile stations is sufficient.

Also illustrated in FIG. 1 is a mobile switching center MSC. The mobile switching center MSC illustrated in FIG. 1 is connected to all ten base stations B1–B10 by cables. The mobile switching center MSC is also co fixed switch telephone network or similar fixed network. All cables from the mobile switching center MSC to the base stations B1–B10 and the cables to the fixed network are not illustrated.

In addition to the mobile switching center MSC illustrated, there may be additional mobile switching centers connected by cables to base stations other than those illustrated in FIG. 1. Instead of cables, other means, for example, fixed radio links, may also be used to connect base stations to mobile switching centers. The mobile switching center MSC, the base stations and the mobile stations are all computer controlled. In land-based cellular communication systems, mobility functions, handover and location management where the network handles the movement of the users are developed and implemented in the mobile switching equipment, i.e., home location register, mobile switching center, base station controllers.

However, there is a need to provide coverage in areas where terrestrial coverage is not viable. Satellite systems may also be used to assure access over regions using different terrestrial standards. As a result, mobile communication via satellites is being developed as a complement to terrestrial mobile telephony. The satellites in these satellite communication systems are either in geostationary orbit, i.e., fixed orbit over a certain area of the earth, or non-geostationary orbits. A geostationary satellite mobile communication system is illustrated in FIG. 2. In this geostationary system, a satellite 10 is generally positioned 30,000 miles above the earth in a stationary position in relation to a point on the earth. A land base station 11 and a plurality of mobile stations can communicate with each other and other users around the world by transmitting and receiving signals to and from the satellite over feederlinks. Since the relative position of the satellite is fixed, geostationary communication systems do not have to consider handoff problems caused by the motion of a satellite. However, geostationary satellite communication systems have several drawbacks. Since the satellite is so far away from the earth, time delays on both the up and down feederlinks can create problems for two-way conversations. Furthermore, the limited output power and antenna gain/diversity of handheld mobile phones also limit the effectiveness of the geostationary satellite communication systems. In addition, huge antennas are needed to create the spot beams on the earth.

To achieve sufficient link margins and to support handheld mobile phones with limited output power and antenna gain/diversity, satellite systems using non-geostationary satellites are being considered. In such non-geostationary systems, the satellites move with respect to a point on the earth. As a result, handover and location management functionalities in the satellite communication network are needed in order to handle the motion of the network's satellites.

Associated with non-geostationary satellites, various techniques are known on how radio resources should be distributed on the ground via satellite beams. Several known techniques are Regionally Oriented Frequency Assignment (ROFA) and Satellite Oriented Frequency Assignment (SOFA). In ROFA, radio resources are assigned to regions meaning that the same geographical region always uses the same radio resource, i.e., frequency, timeslot, or spread spectrum code. Thus, in ROFA, the mobiles will see a fixed radio resource pattern, i.e., frequency reuse pattern, irrespective of the motion of the satellites. In SOFA, the beam from each satellite uses the same frequency irrespective of the satellite location. Thus, in SOFA, the radio resources are connected to the satellites. Thus, the mobiles will see the radio resource patterns, i.e., the frequency reuse pattern, move according to the motion of the satellites.

Due to the motion of the satellites in non-geostationary systems, mobility functions such as handover and location management to handle the satellite's motion need to be developed.

SUMMARY OF THE DISCLOSURE

It is an object of the present invention to provide a non-geostationary satellite communication system which overcomes the deficiencies cited above by providing equipment, protocols and other technical solutions from terrestrial mobile cellular system for mobility functions for a satellite network in order to handle mobility of mobile stations as well as the movement of the satellites in the communication system.

According to one embodiment of the present invention, a non-geostationary ROFA type satellite system where radio resources are fixed to terrestrial regions, are combined with control elements from a terrestrial cellular system is disclosed. Due to the ROFA type configuration, the terrestrial regions are associated with an assigned set of radio resources, e.g., frequency, timeslot and or spread spectrum code. Thus, the ROFA type satellite systems lay out a fixed terrestrial pattern of radio resources, i.e., a cell pattern. The non-geostationary satellite communication system comprises cellular system control means, satellite system control means, and management control means. The cellular system control means assigns each mobile station in said cellular system to a specific region and creates a record of such assignment, wherein each mobile station periodically updates its location within the system. The satellite system control means tracks the position and motion of the satellite and assigns and records the assignment of terrestrial regions, i.e., radio resources, to each satellite, and periodically hands off coverage of one region from one satellite to another. The management control means maps the region assignment records of said mobile stations with said satellite assignment records of said regions so as to perform mobility functions, handover, and location management due to the motion of the satellites and the mobile stations.

BRIEF DESCRIPTION OF THE DRAWINGS

These and other features and advantages of the invention will be readily apparent to one of ordinary skill in the art from the following written description, used in conjunction with the drawings, in which:

FIG. 5 illustrates a layout diagram of a cellular antenna pattern.

DETAILED DESCRIPTION

The present invention will now be described with reference to a satellite communication system. It will be understood by one of ordinary skill in the art that the present invention can also be used in similar systems where the mobility of the system comes from the motion of a vehicle other than a satellite such as an airplane.

Figure 3:
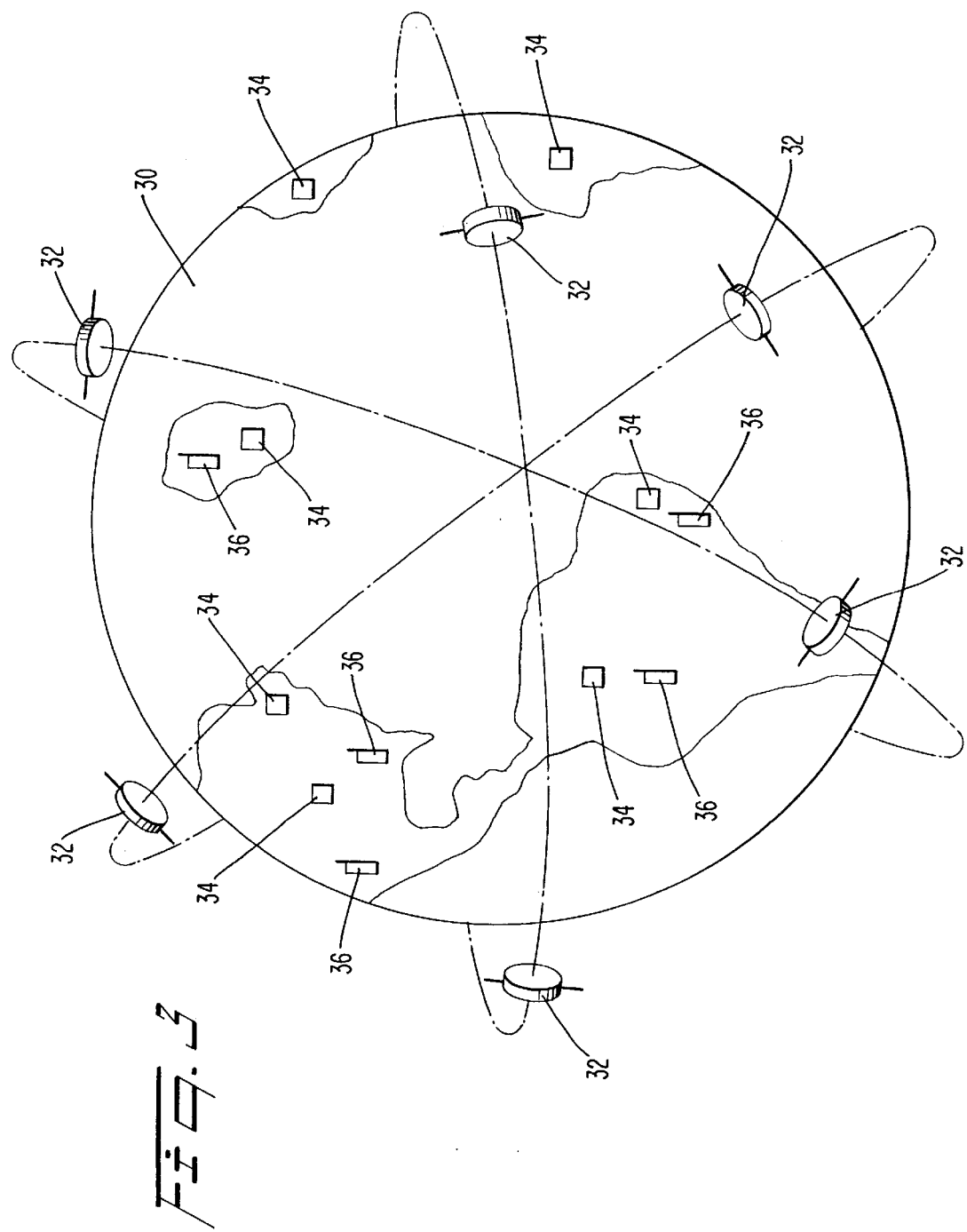
FIG. 3 illustrates a regionally oriented frequency assignment non-geostationary satellite communication system according to one embodiment of the present invention.

A non-geostationary satellite communication system using Regionally Oriented Frequency Assignment (ROFA) according to one embodiment of the present invention is illustrated in FIG. 3. In FIG. 3, a plurality of satellites 32 orbit the earth 30 in non-stationary orbits. Furthermore, land earth stations (LES) 34 which reside on the surface of the earth 30 are in data communication with at least one of the orbiting satellites 32 through data feederlinks. The land earth stations 34 are connected to the public switched telecommunication networks from which calls directed towards subscribers will be received and to which calls placed by subscribers may be sent. The system also includes a number of mobile stations 36. The mobile stations may be configured as conventional portable telecommunications equipment. The present invention accommodates the movement of mobile stations 36 anywhere within the confines of the earth 30 whether on or near the surface or in the atmosphere above the earth. However, nothing requires that the mobile stations 36 move. The present invention operates satisfactorily if the position of the entire population of mobile stations remain stationary. The mobile stations are configured to receive communications from the satellites 32 through communications channels.

Since the present invention is based on a ROFA type system, the cellular radio resources, e.g., frequency, timeslot, and/or spread spectrum code, on earth are fixed to regions. The radio network as perceived from the mobile station on earth is the same type of radio network as the land-based cellular system. Thus, the present invention makes it possible to implement cellular communications via non-geostationary satellite systems using terrestrial cellular equipment, protocol, and other technical solutions as will be described below.

Figure 1:
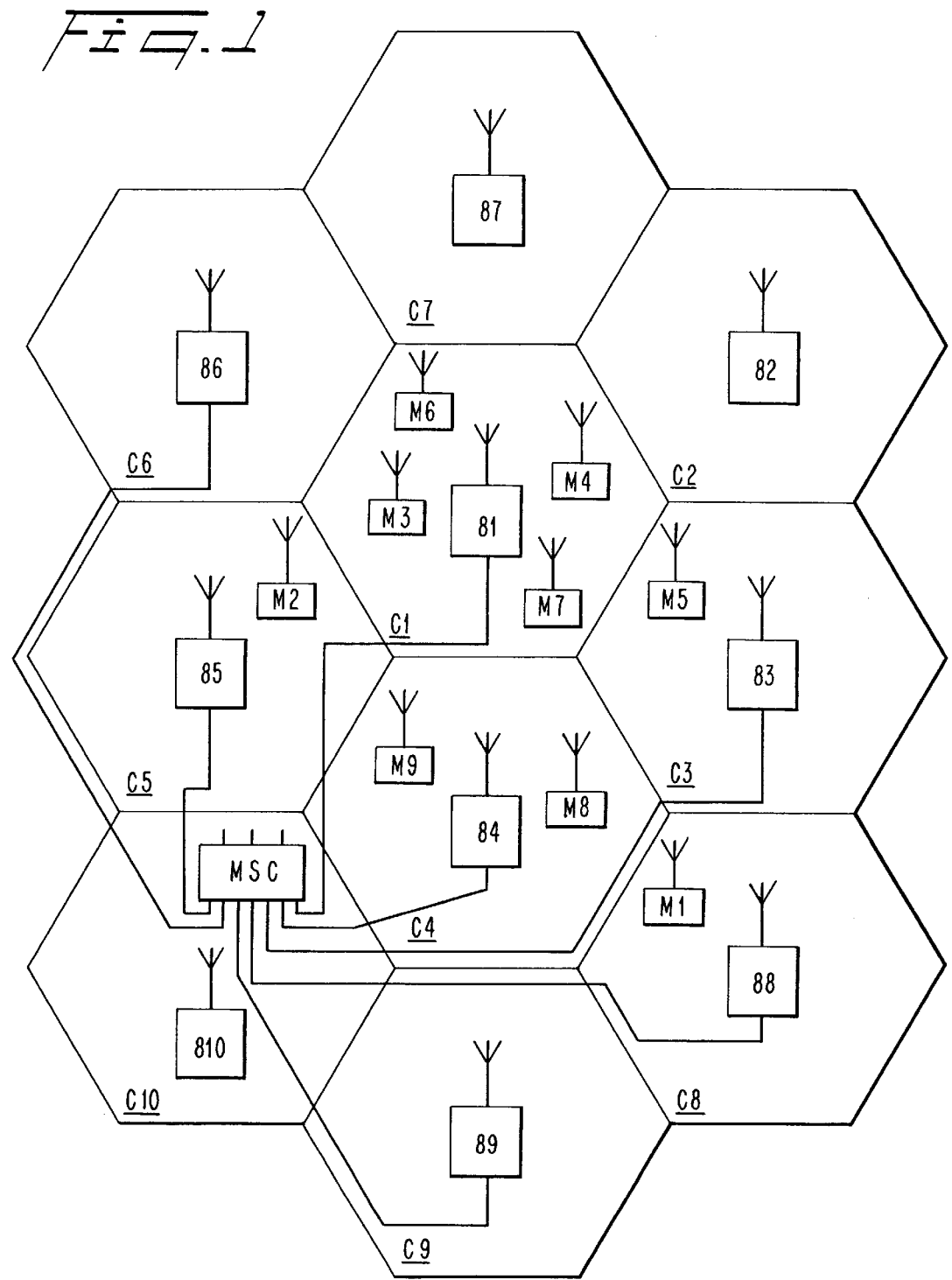
FIG. 1 illustrates a typical land-based cellular communication system.
Figure 2:
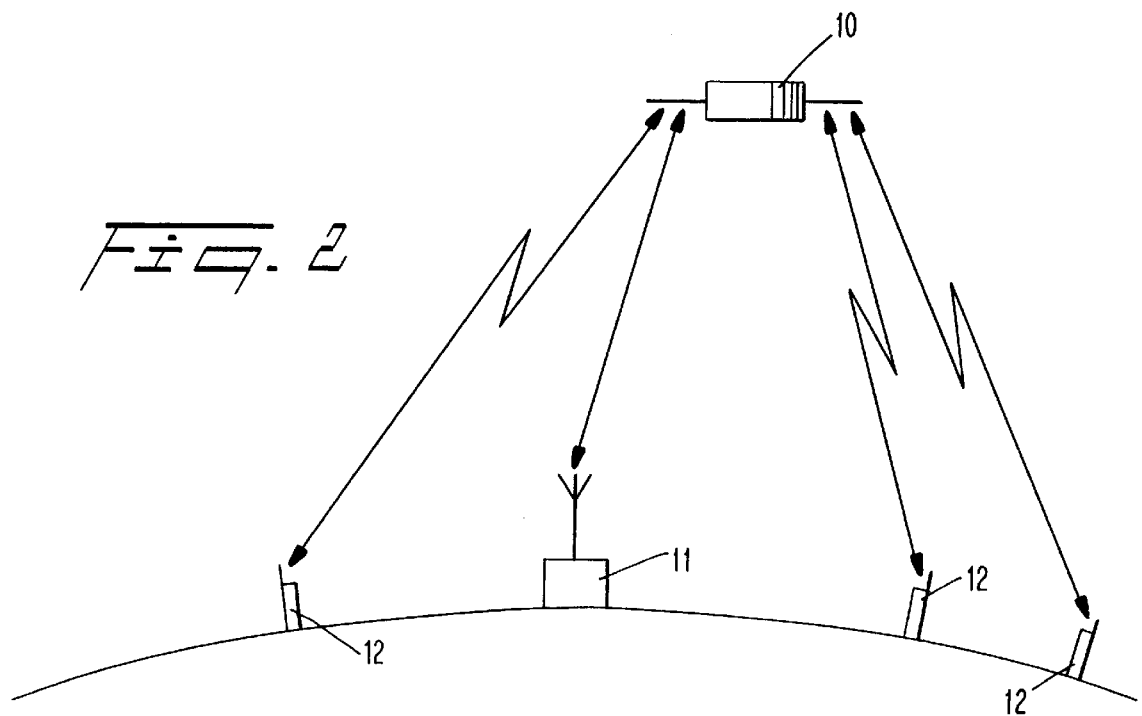
FIG. 2 illustrates a satellite communication system.
Figure 4:
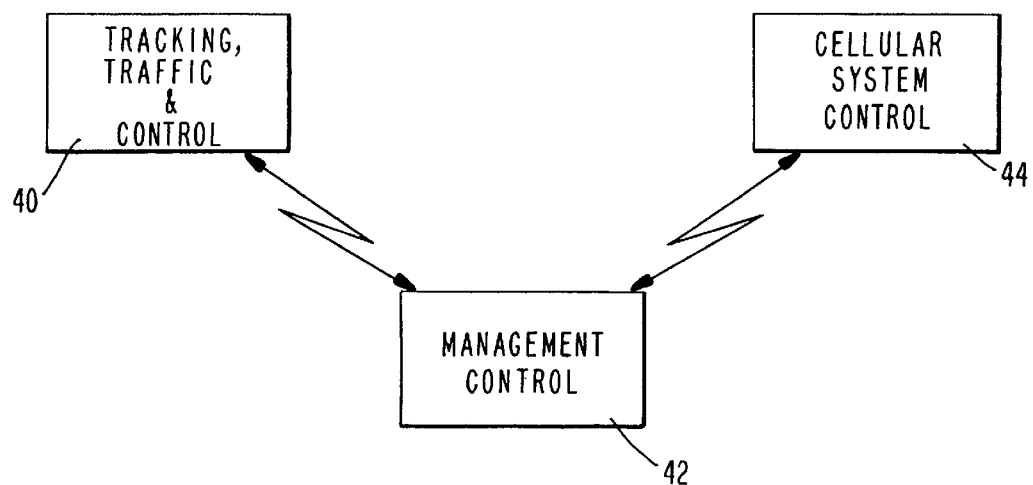
FIG. 4 illustrates a total system control diagram according to one embodiment of the pretent invention.

In FIG. 4, the control system for the non-geostationary satellite communication system can be divided into three main sections: the cellular system control section 44; the management control section 42; and the Tracking, Traffic and Control section 40 (TT&C). As will be described below, each control section has a specific function to perform in order to create an overall control system for a non-geostationary satellite communication system.

Due to low earth orbits, the satellites 32 constantly move relative to the earth 30. If, for example, the satellites 32 are placed in orbits which are around 765 km above the earth, then an overhead satellite 32 travels at a speed of around 25,000 km/hr with respect to a point on the surface of the earth 30. This allows a satellite 32 to be within view of a point on the surface of the earth 30 for a maximum period of approximately nine minutes. It will of course be understood that as the satellites are placed further away from the surface of the earth, the satellite 32 will be within view of a point on the surface of the earth 30 for a longer period of time. According to one embodiment of the present invention, the satellites are placed in medium height orbits, for example 15,000 miles above the surface of the earth, so that a satellite covers an area on the earth for a longer period of time. Due to the relatively low orbits of the satellites, line of sight electromagnetic transmissions from any one satellite cover a relatively small area of the earth at any point in time.

FIG. 5 illustrates a layout diagram of a cellular antenna pattern achieved by satellites 32. As shown in FIG. 5, each satellite 32 includes an array 52 of directional antennas. Each array 52 projects numerous discrete antenna patterns on the earth's surface at numerous diverse angles away from its satellite 32. FIG. 5 shows a diagram of a resulting pattern of cells, regions, or coverage areas 54 that satellite 32 collectively form on the surface of the earth 30. A region 56, which is bounded by a double line in FIG. 5, results from the antenna pattern produced by an antenna array 52 of a single satellite. The cells 54 which reside outside of region 56 are produced by antenna arrays from other satellites. According to the present invention, each of the cells illustrated in FIG. 5 is assigned a set of radio resources, e.g. frequencies, on which to carryout radio communications. It will be recognized by one of ordinary skill in the art that radio resources can be reused in a cellular pattern, e.g. frequency reuse patterns can be used so that the same frequency can be used in a plurality of cells so long as the cells are separated from each other by an appropriate distance.

As the satellites orbit the earth, the individual cells illustrated in FIG. 5 are handed off from one satellite to another as each satellite passes over the horizon. While the cells are handed off from one satellite to another, each cell maintains the radio resource, i.e., frequency, it was originally assigned. Thus, if a cell C1 is assigned a frequency f1 in the satellite communication system, the cell C1 uses the frequency f1 regardless of which satellite is currently providing coverage for the cell. As a result, when the cell C1 is handed off from one satellite to another satellite, the mobile stations operating in cell C1 do not have to be handed off from in one frequency to another.

As illustrated in FIG. 4, the Tracking, Traffic and Control section 40 keeps track of the position and the motion of the satellites within the system. Each satellite system must have a TT&C system that keeps track of the position and motion of the satellites, as well as keeps records of which LES provides the feederlinks for communication traffic to each satellite. TT&C systems are well known in the prior art so they will not be described in more detail. Furthermore, the TT&C section 40 also maintains records that indicate which satellite is handling each region. Thus by its function, the TT&C system of a ROFA type satellite system must keep records, according to the position and movement of the satellites, which indicate which satellite is assigned to each terrestrial cell, given by its fixed set of radio resources, and through which LES (record assignment (cell, satellite, LES)) the satellite communicates. As a result, the TT&C section 40 knows when and to which satellite a region/cell should be handed off to when the satellite currently providing coverage can no longer provide the coverage. Furthermore, the TT&C section 40 also maintains records on which land earth station is handling which satellite or satellites. Thus, the TT&C section 40 also knows which land earth station handles which region or regions on the earth. Furthermore, when a cell/region is handed off from one satellite to another satellite, the records are updated. As a result, the TT&C section 40 has dynamic records which assign each region to its respective land earth station.

According to the present invention, the cellular system control section 44 keeps records of which mobile stations are assigned to specific radio regions or cells. The cellular systems are equipped with location registers, a home location register (HLR) and a visited location register (VLR). As well as other functionalities so that the accurate cell location of each user can be maintained in the records. Thus, the cellular system control elements have support for mobility that assigns users/terminals to cells (record assignment (user/terminal, cell)). According to one embodiment of the present invention, the mobile stations periodically update their locations within the system and these position updates are recorded in the cellular system control section 44. Location updates can be made according to different methods well known in the prior art. One example of location updating can occur at power on of the terminal, wherein the terminal identifies a control channel and, when communication to the base station or the satellite is established, location update information is sent to relevant registers (HLR/VLR). The network can also request periodic registration, i.e., the base station orders the mobiles to send location update information to either the HLR or the VLR. The location update can also be made due to handover between different base stations, i.e., after handover the mobile sends location update information to either the HLR or the VLR. The cellular system control section 44 also has handover functionalities in order to handoff a mobile station from one cell to another.

In order to handle mobility functions due to the satellites' motion in a ROFA type system, a management functionality section 42 between the TT&C section 40 and the cellular system control section 44 is needed. The management control section 42 combines the information recorded in the TT&C system (record assignment (cell, satellite, LES)) and the cellular system control section (record assignment (user/terminal, cell)) into a combined record (combined record assignment (user/terminal, cell, satellite, LES)). This combined record assignment makes it possible to implement a ROFA type satellite mobile communications system using cellular system control elements, i.e., equipment, protocols and other technical solutions developed for terrestrial cellular systems to handle mobility, route calls and invoke services associated with mobile telephony (telephony, teleservices, bearer services, supplementary services, etc.).

By known techniques, the cellular system control section has functions to handle mobility and service provisioning to the mobile user. By interrogations and/or other means of information exchange, the cellular system control section utilizes the combined record assignment maintained by the management control section to handle routing of calls, assignment of LES radio resources, handover due to satellite motion, etc. By such an information exchange, the cellular system control section can, by obtaining the combined record assignment information, always find the current information needed in order to route calls to the appropriate LES, to assign LES radio resources and to perform handover due to satellite motion. The management control section 42 connects the mobile stations recorded assignment records from the cellular system control section 44 with the land earth station and satellite assignment records from the TT&C control section 40. Thus, the management functionality will have dynamic records that map the mobile station onto a region, land earth station, and satellite. Thus, as the satellites move over the horizon, their areas of responsibility are handed off to other satellites. According to the present invention, the management functionality will have all of the information needed for the network equipment using cellular type functionality to perform mobility functions, handover, location update, due to the motion of the mobile station as the satellite. The management control section maintains the combined record assignment and thus must be in communication with the TT&C system and the cellular system control. The management control function can be integrated with the cellular system control, e.g. the HLR. In such an implementation, the HLR will maintain the combined record assignment by communication with the TT&C system. Alternatively, the management control functionality can be integrated with the TT&C system or made into a stand alone node in the satellite communications system.

An example of an implementation of how mobility due to motion of the satellites can be handled in a ROFA type system using the present invention will now be described. In this example, a cell/region x with radio resource f1 will be handed over from satellite s1 to satellite s2. Satellite s1 is feed from a LES L1 and the satellite s2 is feed from a LES L2 during the entire time period for handover. The TT&C system informs the management control section when the cell/region x will be handed off. The management control section informs the LES L2, via channel assignment messages taken from the terrestrial cellular system, to set a certain radio resource to f1. The management control section also performs switch handover of the ongoing call from the LES L1 to the LES L2 using MSC handover defined for the terrestrial cellular system. For this embodiment, each LES is equipped with functionalities from the cellular system control, i.e., MSC functionalities for call control and mobility management and BSC functionalities for radio resource management. In addition, each LES contains physical transmission resources, i.e., transceivers to provide the feederlinks to/from the satellites and network connection to gateways to other systems (PLMN, ISDN, PSTN, etc.) and other elements of the network (HLR, TT&C, management control function, other LES's etc.). In this embodiment, the management control section radio resource management protocols, i.e., BSC functionalities, will be used when the management functionality informs LES 12, via channel assignment messages, to set a radio resource to f1. Mobility management protocols, i.e., MSC functionalities, will be used to handover the ongoing call from LES L1 to LES L2.

After completed handover a location update message can be sent to the HLR giving new routing information to the LES L2. Alternatively, the location updates are only performed when the mobile changes cell. Thus, the HLR will interrogate at call setup the management control section of the present assignment of the call to the LES and thus obtain the relevant routing information.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced herein.

I claim:

1. A communication system that provides communication coverage for moving mobile stations within a communication site that is divided into regions, each having a radio resource assigned thereto, comprising:

a land-based cellular communication system that assigns the mobile stations to a specific region as the mobile stations move within the communication site, said land-based cellular communication system including a cellular system controller that creates an up-datable mobile station assignment record according to the location of the mobile station within the communication site;

a non-geostationary satellite communication system that tracks the position of a plurality of satellites that cover the communication site and assigns at least one of the specific regions to at least one of the plurality of satellites;

wherein the non-geostationary satellite communication system includes a satellite system controller that creates a satellite assignment record according to the assignment of the at least one satellite; and a communication management controller that accesses the mobile station assignment record and the satellite assignment record for assigning the mobile stations to one of the plurality satellites in accordance with the position of the plurality of satellites and the location of the mobile stations.

2. A communication system according to claim 1, wherein said regions are assigned specific frequencies using a frequency reuse pattern.

3. A communication system according to claim 1, wherein each region is assigned a specific set of timeslots.

4. A communication system according to claim 1, wherein each region is assigned a specific set of spread spectrum codes.

5. A conunication system according to claim 1, wherein said non-geostationary satellite communication system updates said up-datable mobile station assignment record according to the location of mobile stations within the communication site.

6. A communication system according to claim 5, wherein said non-geostationary satellite communication system updates said up-datable mobile station assignment record only for mobile stations that are outside of a specific region for which communication coverage is provided by the land-based cellular communication system.

7. A satellite cellular commnunications system, comprising:

a satellite communications system comprising a plurality of satellites for transmitting and receiving a plurality of signals, wherein each satellite is assigned a certain coverage area for a predetermined period of time, and a plurality of land earth stations for communicating with said satellites over feederlinks;

a land based cellular communications system;

a plurality of mobile stations which can communicate with each other and other communication stations using the satellite system through the cellular system;

control means for handing off coverage areas from one satellite to another based on said assignment of coverage areas due to the motion of the satellites, wherein the decision to handoff is made based on information recieved from protocols used by said land-based cellular communication system, wherein said satellite system uses regionally oriented frequency assignment.

8. A satellite cellular communications system according to claim 7, wherein said coverage areas are assigned specific frequencies using a frequency reuse pattern.

9. A satellite/cellular communications system according to claim 7, wherein each of said coverage areas is assigned a specific set of timeslots.

10. A satellite/cellular communications system according to claim 7, wherein each of said coverage area is assigned a specific set of spread spectrum codes.

11. The satellite cellular communications system of claim 7, wherein a mobile station updates its location at a call setup, based on information recorded in the land based cellular communications system.

12. The satellite/cellular communications system of claim 7, wherein a mobile station periodically updates its location, based on information recorded in the land-based cellular communications system.

13. A communication system hat provides communication coverage within a communication site that is divided into terrestrial coverage and satelite coverage regions, comprising:

a plurality of mobile stations moving within the terrestrial coverage and satellite coverage regions;

a land-based cellular communications system for providing communication coverage within the terrestrial coverage regions including a cellular controller that assigns terrestrial coverage regions to the mobile station as the mobile station moves within the communication site, wherein the cellular system controller creates a region assignment record according the assignment of the mobile stations to the terrestrial coverage and satellite coverage regions, a non-geostationary satellite communication system including:

a plurality of orbiting satellites, each satellite providing communication coverage within an assigned satellite coverage region; and a satellite system controller that tracks the plurality of orbiting satellites and based on their positions, assigns a corresponding satellite overage region to each satellite, wherein the satellite system controller creates a satellite coverage assignment record according to the assignment of the satellite coverage regions to the satellites; and a communication management controller that accesses the terrestrial assignment record and the satellite assignment record for assigning the mobile station to a satellite coverage region or a terrestrial coverage region in accordance with the location of the mobile station.

14. A communication system according to claim 13, wherein said non-geostationary satellite communication system updates the region assignment record, based on the location of the mobile stations.

15. A communication system according to claim 13, wherein said non-geostationary satellite communication system updates the region assignment record only for those mobile stations that are outside of the terrestrial coverage region.

16. A method of communicating with a communication unit, comprising the steps of:

dividing a communication site into terrestrial coverage regions and satellite coverage regions;

providing communication coverage within the terrestrial coverage regions through a land-based cellular communication system;

providing communication coverage within the satellite coverage regions through a non-geostationary satellite communication system that includes a plurality of orbiting satellites, each satellite providing communication coverage within an assigned satellite coverage region;

creating a region assignment record at the land-based cellular communication system according to the assignment of the mobile stations to the terrestrial and satellite coverage areas;

tracking the positions of the plurality of orbiting satellites;

based on the position of the plurality of orbiting satellites, assigning a corresponding satellite overage region to each satellite;

creating a satellite coverage assignment record according to the assignment of the satellite coverage regions to the satellites; and accessing the region assignment record and the satellite assignment record for assigning the mobile station to a satellite coverage region or a terrestrial coverage region in accordance with the location of the mobile station.

17. The method of claim 16, wherein the non-geostationary satellite communication system updates the region assignment record based on the location of a mobile communication system.

18. The method of claim 16, wherein the non-geostationary satellite communication system updates the region assignment record only when the mobile station is outside of the terrestrial coverage region.

* * * * *